(12) United States Patent
Shin et al.

(10) Patent No.: US 8,017,181 B2
(45) Date of Patent: Sep. 13, 2011

(54) METHOD FOR PREPARING CORE/SHELL STRUCTURE NANOPARTICLES

(75) Inventors: Seung Koo Shin, Pohang-si (KR); Sung Jun Lim, Busan (KR); Yongwook Kim, Busan (KR)

(73) Assignee: Postech Academy—Industry Foundation (KR)

( * ) Notice: Subject to any disclaimer, the term of this patent is extended or adjusted under 35 U.S.C. 154(b) by 961 days.

(21) Appl. No.: 11/603,546

(22) Filed: Nov. 22, 2006

(65) Prior Publication Data

US 2010/0062154 A1    Mar. 11, 2010

(30) Foreign Application Priority Data

May 2, 2006  (KR) .................. 10-2006-0039436

(51) Int. Cl.
   *B82B 3/00*   (2006.01)
(52) U.S. Cl. .................. 427/215; 427/212; 427/213.3; 428/402; 428/403; 428/404
(58) Field of Classification Search .................. 427/212, 427/213.3, 215; 428/402, 403, 404
   See application file for complete search history.

(56) References Cited

U.S. PATENT DOCUMENTS

| | | | | |
|---|---|---|---|---|
| 5,236,874 A | * | 8/1993 | Pintchovski | 438/2 |
| 2003/0017264 A1 | * | 1/2003 | Treadway et al. | 427/212 |
| 2006/0061017 A1 | * | 3/2006 | Strouse et al. | 264/489 |

* cited by examiner

*Primary Examiner* — Dah-Wei D. Yuan
*Assistant Examiner* — Lisha Jiang
(74) *Attorney, Agent, or Firm* — Baker & Hostetler LLP (57) ABSTRACT

A nanoparticle having a core/shell structure can be rapidly and reproducibly prepared by the inventive method which comprises: (i) dissolving a shell precursor in a solvent to form a shell precursor solution, and then allowing the shell precursor solution to be stabilized at a temperature suitable for the shell precursor to form an overcoat on the surface of a core nanoparticle; and (ii) adding a powder form of the core nanoparticle to the stabilized shell precursor solution.

5 Claims, 6 Drawing Sheets

METHOD FOR PREPARING CORE/SHELL STRUCTURE NANOPARTICLES

RELATED APPLICATIONS

This application claims priority from Korean Application No. 10-2006-0039436 filed on May 2, 2006, the entire contents of which are all hereby incorporated by reference.

FIELD OF THE INVENTION

The present invention relates to a rapid and reproducible method for synthesizing a high quality nano-sized core/shell structure.

BACKGROUND OF THE INVENTION

Semiconductor colloidal nanoparticles such as quantum dots and quantum rods are promising color-tunable light emitters due to the fact that their effective bandgaps can be synthetically manipulated by controlling the particle size and shape. Since a large fraction of the atoms in such a nanoparticle are placed on the particle surface, optical properties of the nanoparticles depend strongly on the surface environment thereof.

Accordingly, in order to prepare highly luminescent nanoparticles, there has been widely employed a passivation technique to put an inorganic overcoat on the surface of a nanoparticle core, the overcoat being a chemically grown shell. Nanoparticles with an inorganic overcoat are often called "core/shell structure nanoparticles". CdSe/ZnS core/shell structure nanoparticles are particularly preferred in many applications due to their high photoluminescence quantum yield and high stability.

Nanoparticles having a core/shell structure are generally prepared by slowly adding a solution containing a shell material precursor into a solution prepared by dissolving a core nanoparticle in a reaction solvent, which is called a "dropwise method". The reaction solvent used above comprises one or more amphiphilic molecules having long alkyl chains and polar head groups. As these amphiphiles act not only as a reaction solvent but also as capping molecules which stabilize the nanoparticle surface, the aforementioned reaction solvent is also referred to as a coordinating solvent.

However, such a conventional dropwise method has problems in that the stability of the core in such a reaction solvent is easily affected by small changes in reaction conditions such as the temperature, solvent composition and concentration. For example, when the core solution is heated to a temperature suitable for shell growth before or during the addition of the shell precursor solution, the core undergoes dissolution and/or ripening, which degrades its original properties such as the emission quantum yield and emission band width. Herein, the term 'ripening' means that nanoparticles in the solution gradually become larger, and at the same time, the size distribution thereof becomes substantially wide. Further, in order to suppress undesirable self-nucleation of the shell precursors which leads to a non-uniform overcoat, the addition rate of the shell precursor solution must be kept a very low level.

In practice, however, the core dissolution and ripening processes, and the self-nucleation of the shell precursors always occur to some extent, competing with the desired core/shell formation. In other words, the conventional dropwise method yields core/shell structure nanoparticles whose properties vary depending on the synthesis batch.

SUMMARY OF THE INVENTION

Accordingly, it is an object of the present invention to provide a rapid and reproducible method for preparing a core/shell structure nanoparticle, which is less sensitive to fluctuations of reaction conditions as compared to a conventional dropwise method.

In accordance with one aspect of the present invention, there is provided a method for preparing a nanoparticle having a core/shell structure which comprises: (i) dissolving a shell precursor in a solvent to form a shell precursor solution, and then allowing the shell precursor solution to be stabilized at a temperature sufficiently high for the shell precursor to grow an overcoat on the surface of a core nanoparticle; and
(ii) adding a powder form of the core nanoparticle into the stabilized shell precursor solution.

BRIEF DESCRIPTION OF THE DRAWINGS

The above and other objects and features of the present invention will become apparent from the following description of the invention, when taken in conjunction with the accompanying drawings, which respectively show.

DETAILED DESCRIPTION OF THE INVENTION

Figure 1:
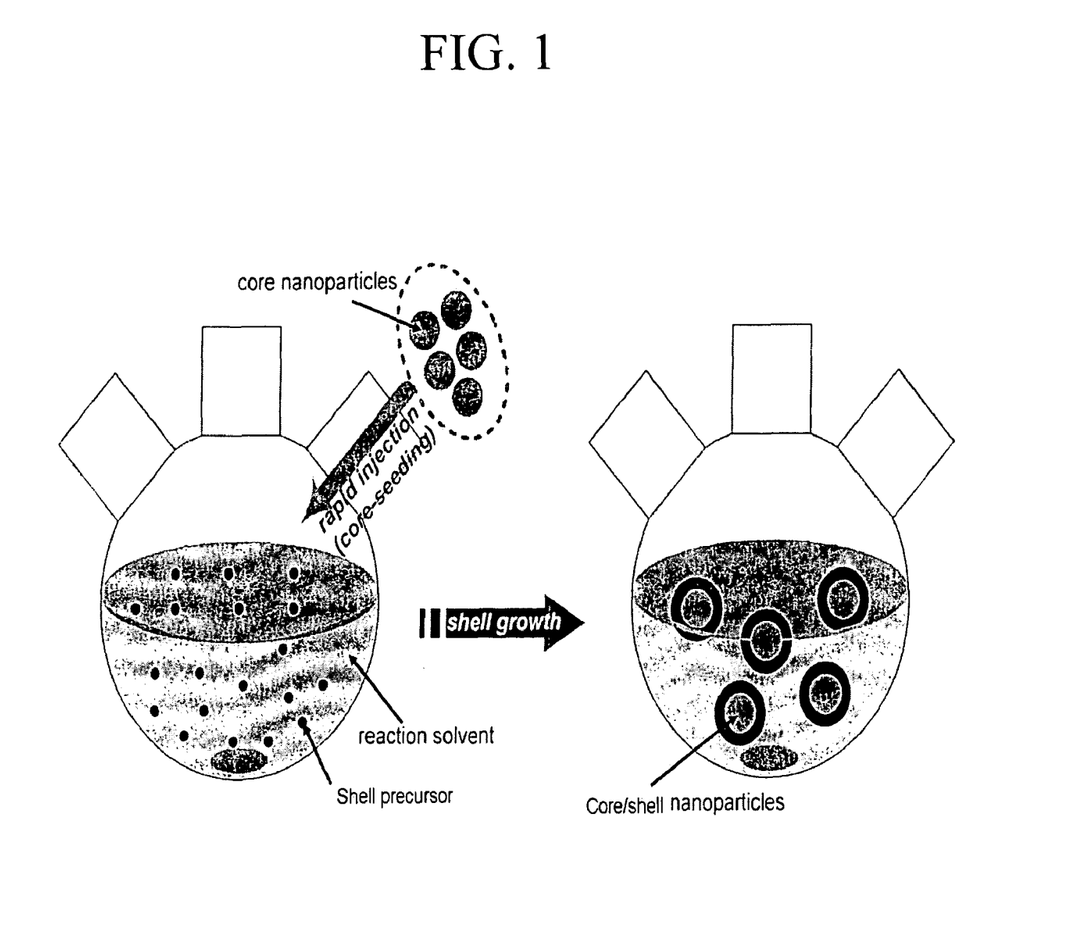
FIG. 1: a schematic processing diagram for the preparation of the nanoparticles having a core/shell structure in accordance with the aspect of the present invention.

The preparation of a core/shell structure nanoparticle of the present invention is characterized by the step of stabilizing a shell precursor solution at a temperature for shell formation in advance, followed by adding a nano-sized core powder thereto, unlike the conventional dropwise method which comprises adding a shell precursor solution to a core solution. FIG. 1 illustrates a schematic processing diagram for the inventive preparation of a core/shell structure nanoparticle.

<Step (i)>

In step (i) in accordance with the present invention, a shell precursor is dissolved in a solvent to form a shell precursor solution, and then the formed shell precursor solution is subjected to stabilization at a temperature sufficiently high for the shell precursor to form an overcoat on the surface of a core nanoparticle.

The shell precursor and solvent used in step (i) may each be selected from the corresponding conventional materials used in various colloidal nanoparticle syntheses.

Specifically, the shell precursor suitable for the inventive method should be stable enough to form a homogeneous shell precursor solution without spontaneously generating any nuclei at an elevated temperature, and also reactive enough to form a passivating layer on the surface of core nanoparticles which are added to the stabilized shell precursor solution.

Representative examples of the shell precursor include Groups II, III and IV metals, metal salts, metal oxides, metal chlorides, metal acetates, Groups V and VI elements optionally having bonded trimethylsilyl groups, and a mixture thereof. Among them, preferred are oxides, chlorides, acetates, fatty acid salts, phosphonic acid salts and thiolates of at least one metal selected from Zn, Cd, Hg, Al, Ga, In, Si, Ge and Sn, bis(trimethylsilyl)-sulfide, bis(trimethylsilyl)-selenide, bis(trimethylsilyl)-telluride, bis(trimethylsilyl)-phosphide, bis(trimethylsilyl)-arsenide, elemental S, Se, Te, P and As.

Suitable for use in the inventive method is the solvent which comprises one or more amphiphilic materials such as a fatty acid, fatty amine, phosphoric acid, phosphine, phosphine oxide, phosphonic acid, phosphinic acid and a derivative thereof, preferably trioctylphosphine oxide, triobutylphosphine oxide, trioctylphosphine, tributylphosphine, $C_{6-18}$ alkylphosphonic acid, $C_{6-18}$ alkylphosphinic acid, $C_{6-18}$ alkylamine, $C_{6-18}$ alkanethiol and $C_{6-18}$ fatty acid. These amphiphiles act not only as a reaction solvent but also as a capping ligand molecule for stabilizing the nanoparticle surface.

The reactivity of the shell precursor may be controlled by varying the combination of the shell precursor and solvent, and/or the composition of the solvent.

In step (i), the shell precursor solution may have a shell precursor concentration ranging from 0.05 to 1.0 M, preferably from 0.2 to 0.5 M. In addition, the shell precursor solution may be stabilized in advance at a temperature sufficiently high for the shell precursor to grow an overcoat on the core surface, e.g., at a temperature ranging from 100 to 250° C., preferably 170 to 230° C.

<Step (ii)>

In step (ii), the desired shell is formed on the core surface by adding a powder form of core nanoparticles to the shell precursor solution stabilized in step (i).

The core used in step (ii) is a colloidal nanoparticle including a quantum dot, quantum well, quantum rod, doped nanoparticle and magnetic nanoparticle. The core nanoparticle is composed of an inorganic material and organic capping ligand molecules coordinated to the inorganic material, and synthesized by reacting the inorganic material and the organic capping ligand molecules at an elevated temperature.

The inorganic material in the core may be of a doped or non-doped structure or a core/shell structure with at least one overcoat. In case the inorganic material has the core/shell structure, a core/multi-shell structure nanoparticle will be obtained as a final product.

Representative examples of the inorganic material include Group II-VI semiconductors such as CdS, CdSe, CdTe, ZnS, ZnSe, ZnTe, HgS, HgSe and HgTe; Group III-V semiconductors such as GaN, GaP, GaAs, InN, InP and InAs; Group IV semiconductors such as Si; and a combination thereof. Representative examples of the organic capping ligand molecule include a fatty acid, fatty amine, phosphoric acid, phosphine, phosphine oxide, phosphonic acid, phosphinic acid, a derivative thereof, and a mixture thereof.

The core nanoparticle used in the inventive method should have a high purity and a fine powder form. The addition of a powder form of core particles is preferably conducted to minimize local disturbance in the shell precursor solution, e.g., undesirable temperature and concentration changes generated by the core addition, thereby inhibiting the self-nucleation of the shell precursors or unwanted side reactions. The addition rate of the core powder may be appropriately determined based on a desirable shell thickness and the used shell precursor composition.

As described above, the present invention provides a rapid and reproducible method for preparing a core/shell structure nanoparticle, which is far less sensitive to fluctuations of reaction conditions as compared to a conventional dropwise method. Further, as the core dissolution and ripening, and the shell precursor self-nucleation do not occur, the core/shell structure nanoparticle prepared by the inventive method has an improved emission quantum yield and a narrow emission band width.

The following Examples are given for the purpose of illustration only, and are not intended to limit the scope of the invention.

<Preparation 1> Synthesis of CdSe Core

A CdSe core nanoparticle was synthesized using the method developed by Xiogang Peng and co-workers with some modifications ([Peng et al., *J. Am. Chem. Soc.* 123:183 (2001)] and [Qu et al., *Nano Lett.* 1:333 (2001)]).

1-a) Synthesis of Green Fluorescent CdSe Core (Emission Wavelength @ ~510 nm, Emission FWHM ~25 nm)

0.5 mmol of 99.998% cadmium oxide (CdO), 1 mmol of 98% tetradecylphosphonic acid (TDPA), 4 g of 99% tri-n-octylphosphine oxide (TOPO) and 2 g of 90% 1-hexadecylamine (HAD) were mixed in a 25 ml 3-neck round-bottom-flask, and the resulting turbid brown mixture was heated to 350° C. under an Ar atmosphere until it became colorless and clear, followed by cooling the solution to 290° C. 2 ml of an 1.25 M Se/tri-n-octylphosphine (TOP) stock solution was rapidly injected thereto while vigorously stirring. The Se/TOP stock solution was prepared by dissolving a 99.99% elemental selenium powder in 90% TOP. After the completion of injection, the resulting solution was rapidly cooled to 250° C. and kept at that temperature for 3 min to induce the growth of core particles, followed by cooling to 60° C. or less. The precipitated solids were filtered, washed twice with anhydrous methanol, and dried under a vacuum to obtain the title compound, green fluorescent CdSe core nanoparticles.

1-b) Synthesis of Red Fluorescent CdSe Core (Emission Wavelength @ ~610 nm, Emission FWHM ~27 nm)

2 mmol of 99.998% CdO and 12 mmol of 95% stearic acid (SA) were mixed in a 25 ml 3-neck round-bottom-flask, and the resulting turbid brown mixture was heated to 200° C. under an Ar atmosphere until it became colorless and clear, followed by cooling the solution to room temperature. 16 g of 99% TOPO and 8 g of 90% HDA were added to the solution, and heated to 290° C. 8 ml of an 1.25 M Se/TOP stock solution was rapidly injected thereto while vigorously stirring. After the completion of injection, the resulting solution was rapidly cooled to 250° C. and kept at that temperature for 10 min to induce the growth of core particles, followed by cooling to 60° C. or less. The precipitated solids were filtered, washed twice with anhydrous methanol, and dried under a vacuum to obtain the title compound, red fluorescent CdSe core nanoparticles.

Example 1

Figure 2:
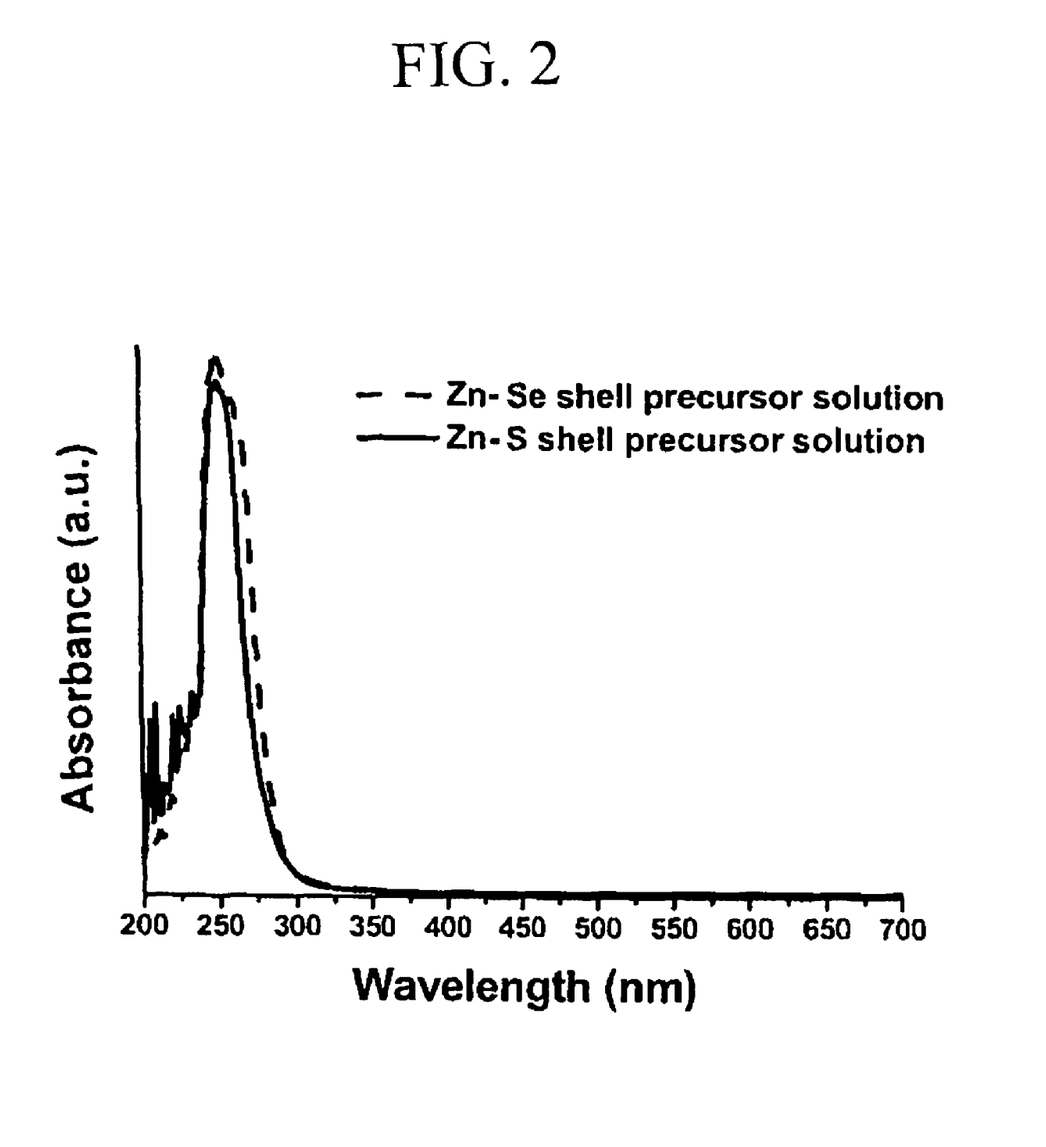
FIG. 2: UV-Vis absorption spectra of the Zn—Se and Zn—S shell precursor solutions obtained in Examples 1 and 2.

Synthesis of CdSe/ZnSe Structure Nanoparticles 0.5 mmol of 99.99% zinc oxide (ZnO) and 2.5 mmol of 98% lauric acid (LA) were mixed in a 25 ml 3-neck round-bottom-flask, and the resulting turbid brown mixture was heated to 200° C. under an Ar atmosphere until it became colorless and clear, followed by cooling the solution to room temperature. 2 g of 99% TOPO and 1 g of 90% HDA were added to the solution, heated to 200° C. and stabilized. 0.8 ml of a 2.5 M Se stock solution in 97% tri-n-butylphosphine (TBP) was added to the stabilized solution and slowly heated to 240° C. An aliquot of the resulting solution (shell precursor solution) was taken and diluted with anhydrous chloroform, a UV-Vis absorption spectrum of which is shown in FIG. 2. In FIG. 2, an absorption shoulder for the ZnSe crystal is not detected in the ~310 nm wavelength region, suggesting that the stable shell precursor solution did not contain self-nucleated ZnSe nanoparticles.

Figure 3A:
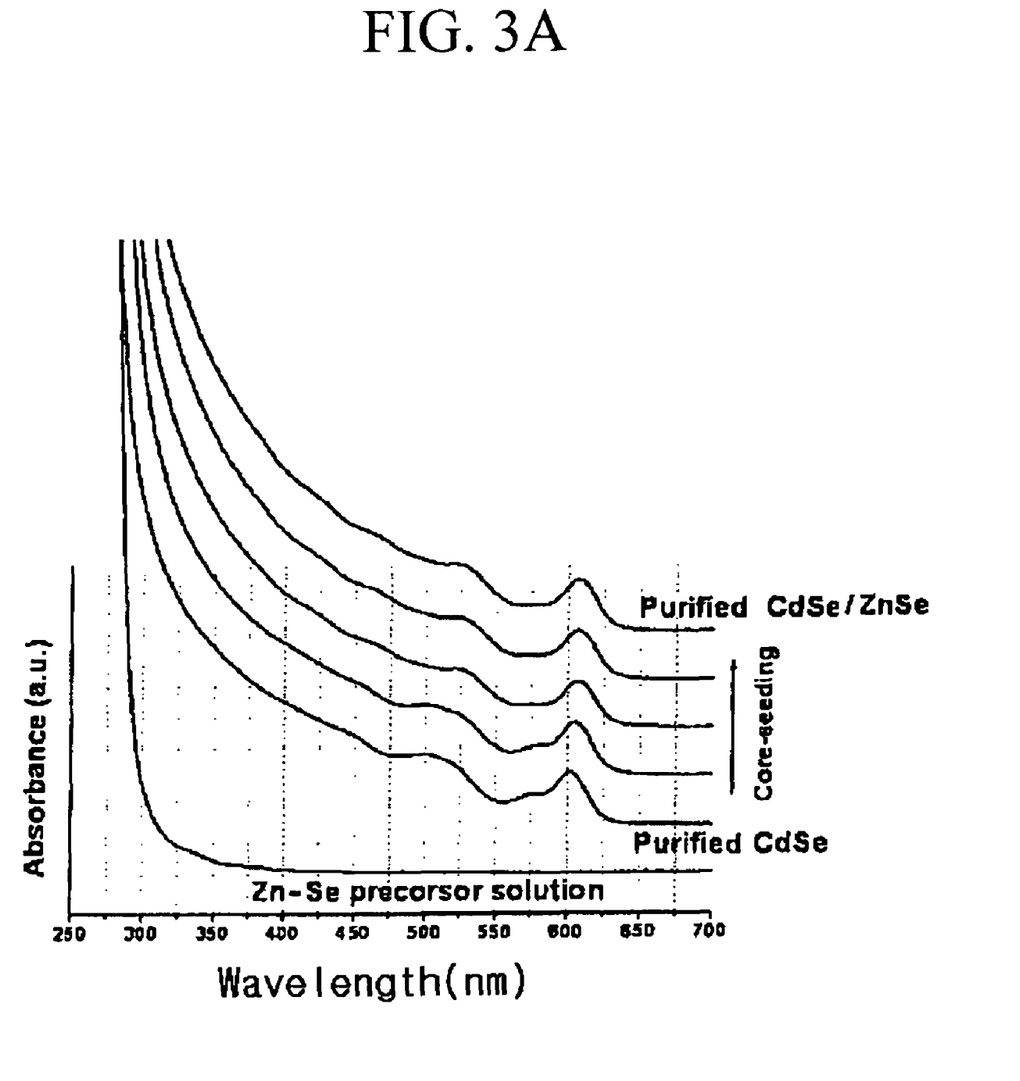
FIGS. 3A and 3B: UV-Vis absorption spectra illustrating the temporal evolution of the CdSe/ZnSe and CdSe/ZnS nanoparticles formed in reaction solutions according to the lapse of time after CdSe core-seeding in Examples 1 and 2, respectively.

Then, 20 mg of the CdSe core powder obtained in Preparation 1 was quickly added to the shell precursor solution prepared above using a spatula while vigorously stirring. The growth of a ZnSe overcoat was monitored by taking aliquots of the resulting solution at 20-30 second intervals. 10-20 µl of 1-octanethiol was added to each aliquot and subjected to absorption spectrum measurement (FIG. 3A). When the retaining of the fluorescence of 80% or higher was observed, the temperature of the reaction solution was lowered to 150° C. and kept for 1 hour for the purpose of annealing. The reaction was terminated by cooling the reaction solution. It was observed that the growth of the ZnSe overcoat reached a maximum level in 5-10 minutes after seeding of the CdSe core. Thereafter, the precipitated CdSe/ZnSe structure nanoparticle was isolated and purified according to the procedure used in Preparation 1.

Example 2

Synthesis of CdSe/ZnS and (CdSe/ZnSe)/ZnS Structure Nanoparticles 2-a) Synthesis of CdSe/ZnS Structure Nanoparticles 0.2 mmol of zinc stearate, 3 g of 90% TOPO and 90% HDA were mixed in a 25 ml 3-neck round-bottom-flask, the mixture was heated to 200° C. and stabilized under an Ar atmosphere. 1 ml of a 0.2 M S/TOP stock solution in 90% TOP was added dropwise to the stabilized solution with the rate of 2 ml/hour. An aliquot of the resulting solution (shell precursor solution) was taken and diluted with anhydrous chloroform, a UV-Vis absorption spectrum of which is shown in FIG. 2. In FIG. 2, an absorption shoulder for the ZnS crystal is not detected in the ~290 nm wavelength region, suggesting that the stable shell precursor solution did not contain self-nucleated ZnS nanoparticles.

Figure 3B:
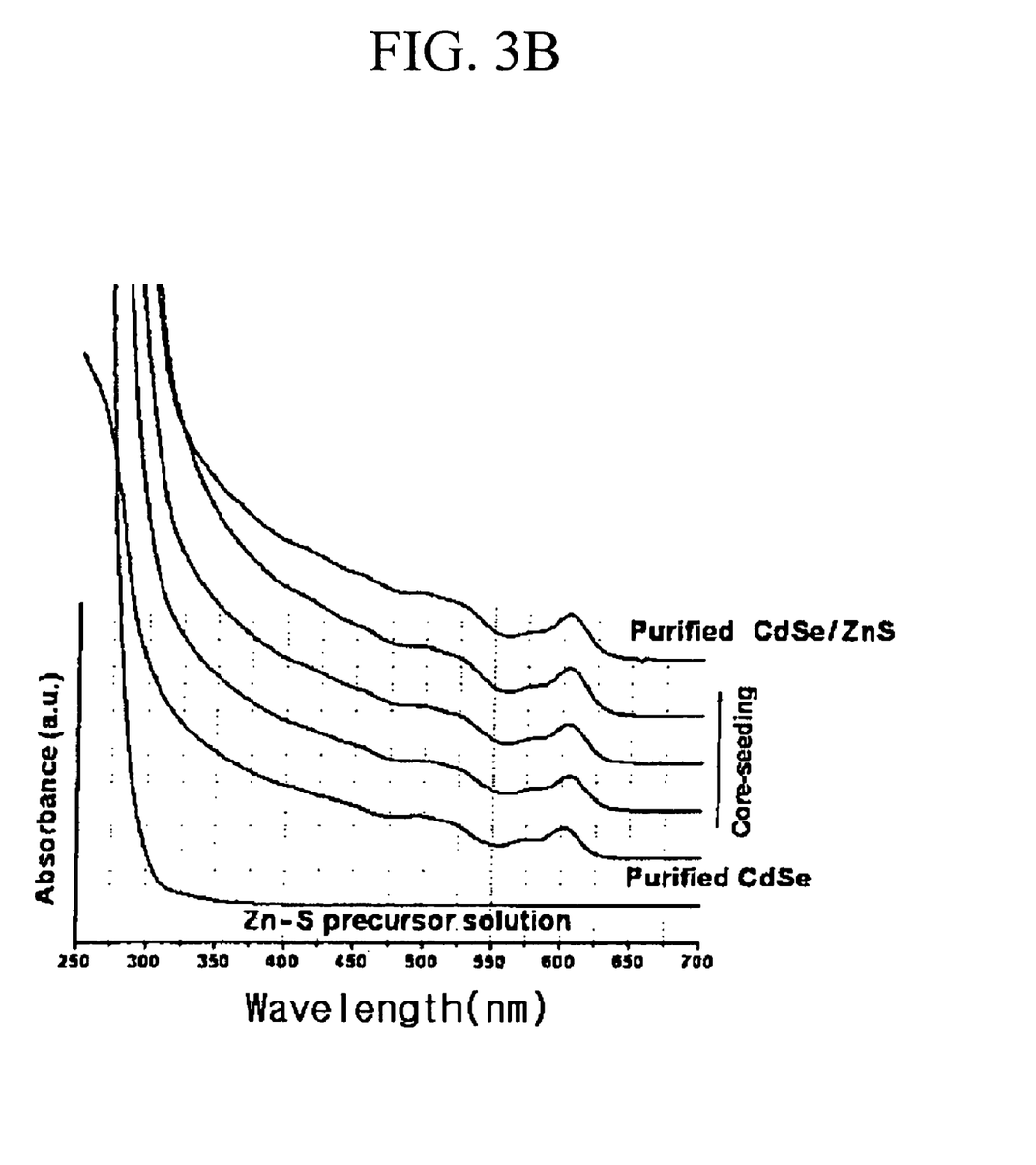

Then, 10 mg of the CdSe core powder obtained in Preparation 1 was quickly added to the shell precursor solution prepared above using a spatula while vigorously stirring. The growth of a ZnS overcoat was monitored by taking aliquots of the resulting solution at 20-30 second intervals. 10-20 µl of 1-octanethiol was added to each aliquot and subjected to absorption spectrum measurement (FIG. 3B). When the retaining of the fluorescence of 80% or higher was observed, the temperature of the reaction solution was lowered to 150° C. and kept for 1 hour for the purpose of annealing. The reaction was terminated by cooling the reaction solution. It was observed that the growth of the ZnS overcoat reached a maximum level in 5-10 minutes after seeding of the CdSe core. Thereafter, the precipitated CdSe/ZnS structure nanoparticle was isolated and purified according to the procedure used in Preparation 1.

2-b) Synthesis of (CdSe/ZnSe)/ZnS Structure Nanoparticles 0.2 mmol of zinc stearate, 3 g of 90% TOPO and 90% HDA were mixed in a 25 ml 3-neck round-bottom-flask, and the mixture was heated to 200° C. and stabilized under an Ar atmosphere. 1 ml of a 0.2 M S/TOP stock solution in 90% TOP was added dropwise to the stabilized solution with the rate of 2 ml/hour. An aliquot of the resulting solution (shell precursor solution) were taken and diluted with anhydrous chloroform, a UV-Vis absorption spectrum of which is shown in FIG. 2. In FIG. 2, an absorption shoulder for the ZnS crystal is not detected in the ~290 nm wavelength region, suggesting that the stable shell precursor solution did not contain self-nucleated ZnS nanoparticles.

Then, 20 mg of the CdSe/ZnSe powder obtained in Example 1 as a core was quickly added to the shell precursor solution prepared above using a spatula while vigorously stirring. The growth of a ZnS overcoat was monitored by taking aliquots of the resulting solution at 20-30 second intervals. 10-20 µl a of 1-octanethiol was added to each aliquot and subjected to absorption spectrum measurement. When the retaining of the fluorescence of 80% or higher was observed, the temperature of the reaction solution was lowered to 150° C. and kept for 1 hour for the purpose of annealing. The reaction was terminated by cooling the reaction solution. It was observed that the growth of the ZnS overcoat reached a maximum level in 5-10 minutes after seeding of the CdSe/ZnSe core. Thereafter, the precipitated (CdSe/ZnSe)/ZnS core/double-shell structure nanoparticle was isolated and purified according to the procedure used in Preparation 1.

Figure 4:
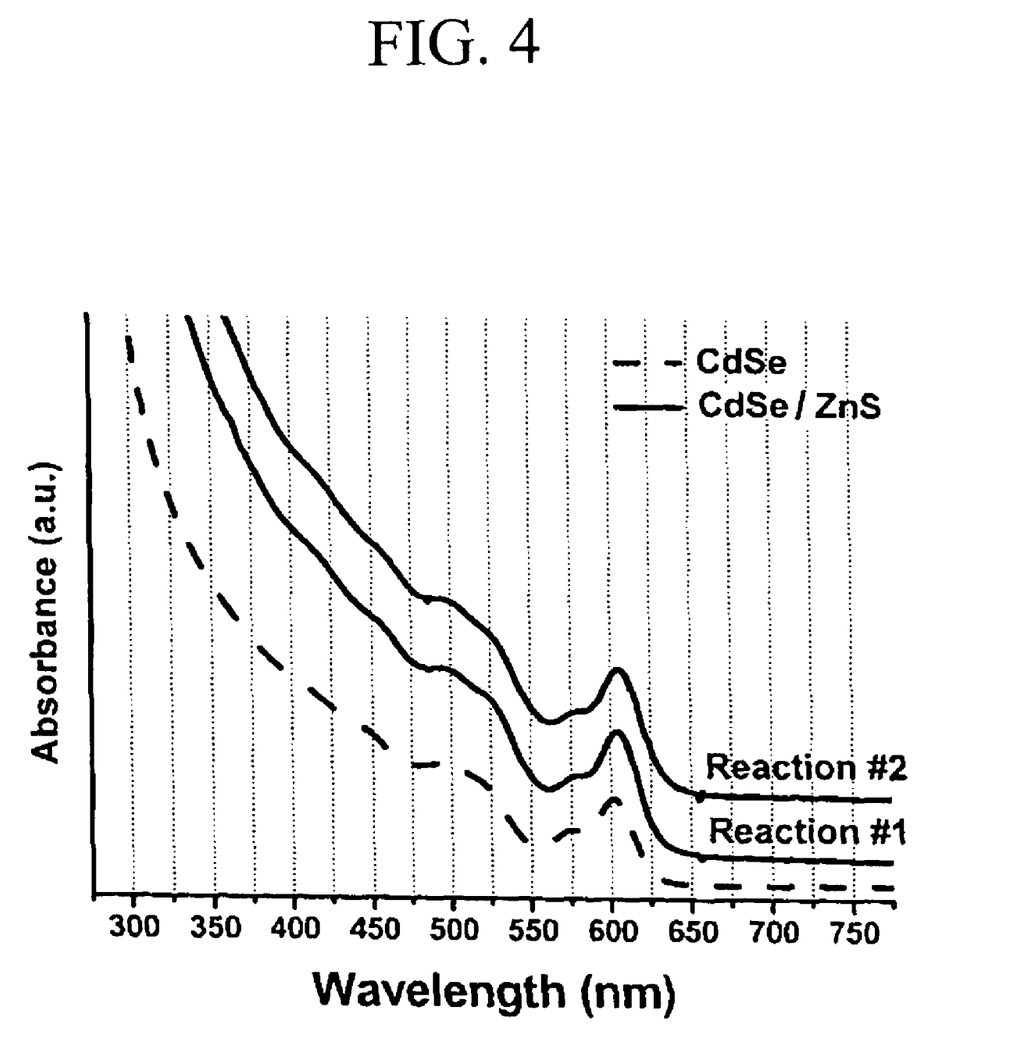
FIG. 4: UV-Vis absorption spectra of the two CdSe/ZnS nanoparticles obtained from two separate reactions in Example 2, respectively.

UV-Vis absorption spectra of the two CdSe/ZnS nanoparticles obtained in Example 2 are shown as two solid lines in FIG. 4. The graphs in FIG. 4 exhibit high reproducibility of the inventive method which is characterized by stabilizing the reaction conditions prior to core-seeding and minimizing possible fluctuations generated on the core-seeding through the use of a powder form of the core.

Figure 5:
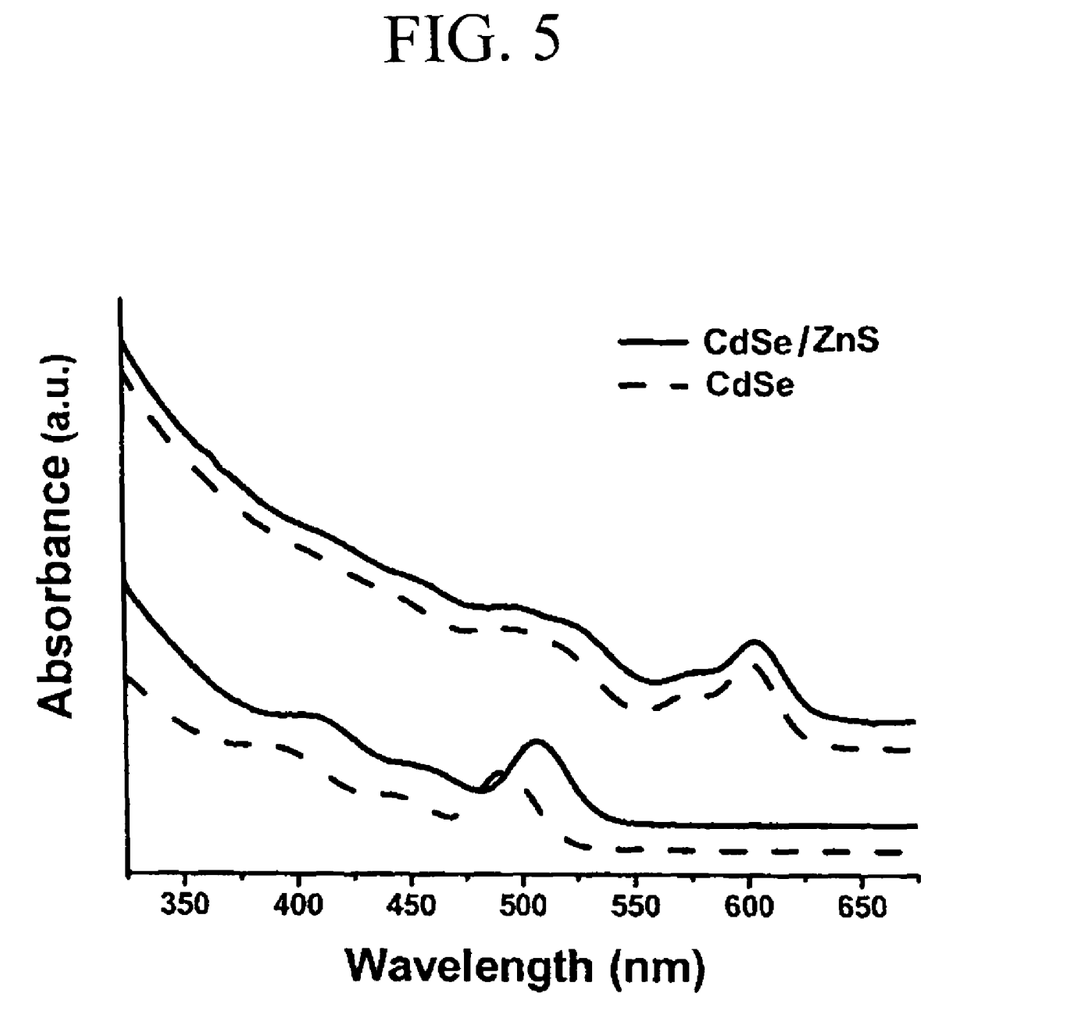
FIG. 5: UV-Vis absorption spectra of the CdSe/ZnS nanoparticles obtained by using two core nanoparticles having different sizes in Example 2, respectively.

Further, shown in FIG. 5 are UV-Vis absorption spectra of the two CdSe/ZnS nanoparticles obtained by using two CdSe core nanoparticles having different sizes, respectively, in Example 2. The result of FIG. 5 suggests that the core/shell structure nanoparticles with various sizes can be easily synthesized without any significant deterioration of the original core properties such as the size distribution and absorption band structure.

As described above, in accordance with the method of the present invention, a high quality of a core/shell structure nanoparticle can be rapidly and reproducibly prepared due to suppressed core dissolution/ripening and self-nucleation of shell precursor during the processing of reaction.

While the invention has been described with respect to the above specific embodiments, it should be recognized that various modifications and changes may be made to the invention by those skilled in the art which also fall within the scope of the invention as defined by the appended claims.

What is claimed is:

1. A method for preparing a nanoparticle having a core/shell structure which comprises:
   (i) preparing CdSe core nanoparticle in a powder form;
   (ii) dissolving a ZnS or ZnSe shell precursor in a solvent to form a shell precursor solution;
   (iii) heating the shell precursor solution at an elevated temperature to prevent self-nucleation of the shell precursor and stabilize the shell precursor solution;
   (iv) adding the powder form of the core nanoparticle into the pre-heated stabilized shell precursor solution;
   (v) maintaining the temperature of the solution for a time period sufficient to form an overcoat on the surface of the core nanoparticle;
   (vi) monitoring the growth of the overcoat being formed on the surface of the core nanoparticle; and
   (vii) cooling the solution to terminate the growth of the shell overcoat.

2. The method of claim 1, wherein the solvent used in step (ii) comprises one or more amphiphilic materials selected from the group consisting of a fatty acid, fatty amine, phosphoric acid, phosphine, phosphine oxide, phosphonic acid, phosphinic acid and a derivative thereof.

3. The method of claim 2, wherein the solvent used in step (ii) comprises one or more amphiphilic materials selected from the group consisting of trioctylphosphine oxide, triobutylphosphine oxide, trioctylphosphine, tributylphosphine, $C_{6-18}$ alkylphosphonic acid, $C_{6-18}$ alkylphosphinic acid, $C_{6-18}$ alkylamine, $C_{6-18}$ alkanethiol and $C_{6-18}$ fatty acid.

4. The method of claim 1, wherein the shell precursor concentration of the shell precursor solution formed in step (ii) is in the range of 0.05 to 1.0 M.

5. The method of claim 1, wherein in step (iii), the stabilization of the shell precursor solution is performed at an elevated temperature ranging from 100 up to 250° C.

* * * * *